United States Patent [19]
Lucien

[11] 3,807,897
[45] Apr. 30, 1974

[54] RIGID HUBS FOR VARIABLE-PITCH PROPELLERS AND GAS TURBINES

[75] Inventor: Lermusiaux Lucien, 42-Saint-Entienne, France

[73] Assignee: Societe De Construction Et D'Exploitation De Materials et Moteurt S.C.E.M.M., Lubeck, Paris, France

[22] Filed: June 3, 1971

[21] Appl. No.: 149,561

[30] Foreign Application Priority Data
June 11, 1970 France .............................. 70.21449

[52] U.S. Cl. ................................ 416/140, 416/141
[51] Int. Cl. ............................................ B64c 27/38
[58] Field of Search .......... 416/106, 140, 114, 135, 416/138, 139, 141

[56] References Cited
UNITED STATES PATENTS

| 2,672,202 | 3/1954 | Pullin et al. | 416/140 X |
| 3,026,942 | 3/1962 | Cresap | 416/114 |
| 3,280,918 | 10/1966 | Drees et al. | 416/135 X |
| 3,310,119 | 3/1967 | Watson | 416/134 X |
| 3,330,362 | 7/1967 | Kastan | 416/132 X |
| 3,412,807 | 11/1968 | Kretz | 416/106 X |
| 3,606,575 | 9/1971 | Lermusiaux | 416/135 |

FOREIGN PATENTS OR APPLICATIONS

| 1,442,684 | 5/1966 | France | 416/140 |
| 2,025,834 | 12/1970 | Germany | 416/141 |

Primary Examiner—Everette A. Powell, Jr.
Attorney, Agent, or Firm—Stevens, Davis, Miller & Mosher

[57] ABSTRACT

A rigid hub for variable-pitch propellers, lifting rotors, aeroplane engines, fans and axial gas turbines is described having flexible ties interconnecting the extended portions of the jaws and are disposed in a plane which is substantially parallel to the plane of the hub member but at a distance therefrom. The rigid hub is particularly but not exclusively for use in gyroplanes and helicopters.

10 Claims, 3 Drawing Figures

RIGID HUBS FOR VARIABLE-PITCH PROPELLERS AND GAS TURBINES

The invention relates to improvements to hubs for variable-pitch propellers, lifting rotors, aeroplane motors, fans and axial gas turbines of the "rigid" kind, comprising:

a rotating shaft, a flat hub member rigidly secured to the shaft and having at least two peripheral zones for attaching the propeller blades, the central plane of the hub member being at right-angles to the aforementioned shaft and the hub member being flexible in a direction perpendicular to its plane, connecting means between the hub member attachment zones and each propeller blade, the connecting means comprising securing jaws or forks or the like rigidly mounted on the hub member, the jaws comprising extended portions at a vertical distance from the central plane of the hub member, and check means comprising flexible ties or fastenings designed to oppose any deformation of the hub member produced by simultaneous pulsation or flapping motion of all the blades in at least one direction parallel to the rotating shaft.

The invention relates more particularly though not exclusively to hubs of the aforementioned kind for aircraft such as gyroplanes and helicopters.

It is known that in rigid hubs of the aforementioned kind the hub member may be subjected to considerable bending forces. This applies inter alia to a helicopter rotor having a vertical rotating shaft when the rotation speed of the rotor is small or zero, since the centrifugal force does not sufficiently or does not at all compensate the force due to the weight of the blades, and the hub member is then subjected to considerable downward bending forces; furthermore, if the helicopter suddenly touches the ground on landing, the bending forces may be increased owing to simultaneous downward flapping motion of all the blades.

Accordingly, rigid hubs wherein the hub member is flexible and the blades are secured thereon, have already been provided with check means comprising flexible ties which oppose the downward bending of the hub member when the rotor rotates slowly or not at all.

However, prior-art check means comprising flexible ties, while they have the advantage of being light and inexpensive and are able to withstand high checking forces, have the disadvantage of reducing the flexibility of the hub member necessary for allowing a tilting motion of the plane described by the ends of the blades (or blade tips), which tilting occurs when the blades generate a plane or conical surface round an axis which is different from the axis of the rotating shaft. The check means may even make such tilting impossible beyond a certain amplitude.

The main aim of the invention is to obtain "rigid" hubs of the aforementioned kind which are better adapted than prior-art devices to practical conditions, and which inter alia do not have the aforementioned disadvantage.

According to the invention, a "rigid" hub for a variable-pitch propeller of the aforementioned kind is characterised in that flexible ties interconnect the extended portions of the jaws and are disposed in a plane which is substantially parallel to the plane of the hub member but is at a vertical distance therefrom.

Advantageously, the flexible ties are metal cables equipped with tightening means.

Preferably, the tightening means comprise resilient means which can limit the slackening of the flexible ties.

When the number of propeller blades is at least three, the extended portion of a jaw associated with a blade is connected by flexible ties preferably to the two extended portions of the neighbouring jaws so that the flexible ties form a closed polygon.

In addition to the aforementioned features, the invention comprises other features which are preferably used at the same time and which will be described in greater detail hereinafter with reference to a preferred embodiment of the invention which will now be described in greater detail with reference to the following non-limitative drawings.

Figure 1:
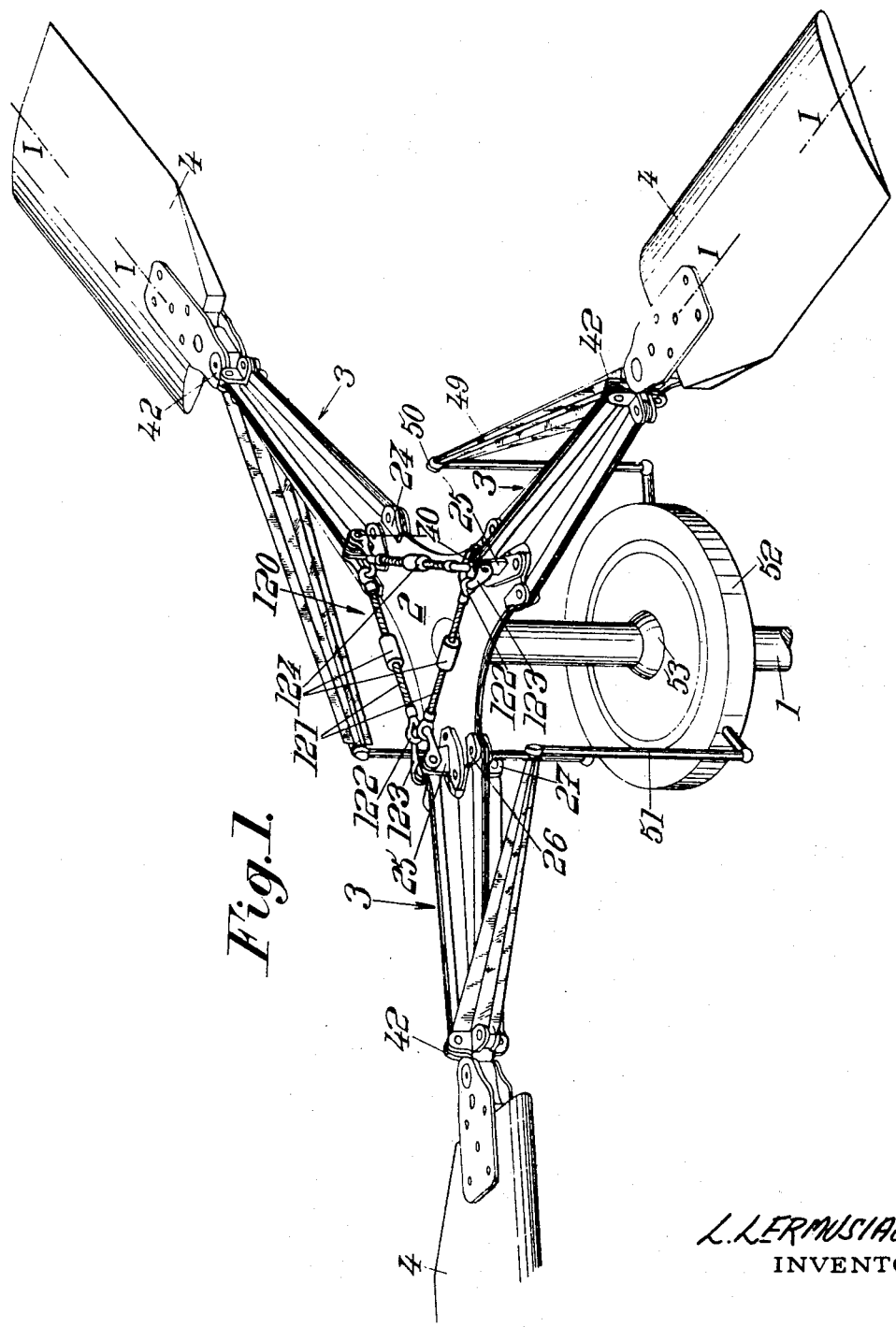
FIG. 1 is a perspective view of a rigid hub according to the invention.

The drawings, more particularly FIG. 1, show how the invention is applied to "rigid" rotors for helicopters.

The hub assembly comprises a rotating shaft 1, a flat hub member 2 rigidly connected to shaft 1 by suitable means (not shown) and connecting arms 3 between the hub member 2 and the blades 4 of a variable-pitch propeller.

The central plane of the hub member 2 is at right-angles to shaft 1.

Each connecting arm 3 corresponds to an arm 49 for adjusting the pitch of a blade 4.

Arm 49, which is prevented from bending or twisting, is secured to a mounting 42. Mounting 42 is provided at that end of a connecting arm 3 nearest a blade 4, in order to secure the latter to arm 3. Arm 49 is disposed substantially in the plane of hub member 2 and its end 50 remote from mounting 42 is connected to a known means 51, 52, 53 for adjusting the pitch.

Arm 49 is used to convey to blade 4 a rotary movement round a longitudinal axis I—I or "pitch variation axis".

The hub member 2 has the shape of a star with a number of arms (three in the present example) distributed at regular angular intervals around shaft 1. The end of each arm of hub member 2 forms a blade attachment zone and a connecting arm 3 is secured thereto. The hub member 2 is flexible in a direction perpendicular to its plane.

That end of each connecting arm 3 which is nearest shaft 1 is secured to the hub member 2 by drag jaws 24, 26 and by flapping jaws 25, 27 disposed on each side of the plane of, and rigidly mounted on, the hub member.

Jaws 25, 27 comprise extended portions at a vertical distance from the central plane of the hub member 2. The extended portions comprise lugs in planes at right-angles to that of the hub member; ends of arms 3 rest between the lugs. The lugs have holes, at a distance from the plane of the hub member 2, opposite holes in the ends of arms 3. Bolts such as 40 extend through the holes in the lugs and ends and connect arms 3 to jaws 25, 27. As FIG. 1 clearly shows, bolts 40 are at a distance from the plane of hub member 2.

A rigid hub of the aforementioned kind is described in French Patent No. 1 568 117 filed on 12 February 1968 by the Societe de Construction et d'Exploitation de Materiels et Moteurs S.C.E.M.M. for "Improvements to 'rigid' hubs for variable-pitch propellers and gas turbines".

Check means 120, which are disposed in a plane above and substantially parallel to the plane of the hub member, and connect the flapping jaws 25 disposed above the plane of hub member 2.

The check members 120 comprise flexible ties 121 interconnecting those areas of the flapping jaw lugs 25 which are remote from the plane of hub member 2.

Flexible ties 121 are advantageously twisted metal cables, one end of which has a ring 122 which engages in a U-shaped securing means or shackles 123 adapted to grip the lugs of jaws 25. The ends of securing means 123 have holes for bolts 40, which thus join means 123, jaws 25 and arms 3. Means 123 can rotate around bolts 40.

Figure 2:
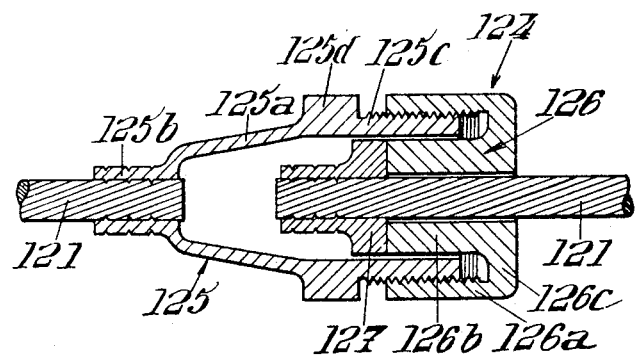
FIG. 2 is a longitudinal cross-section, on a larger scale than in FIG. 1, of a tightening means for a flexible tie.
Figure 3:
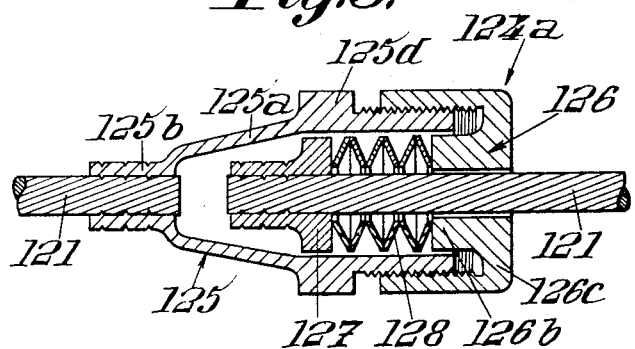
FIG. 3 is a longitudinal cross-section of an alternative embodiment of the tightening means in FIG. 2.

That end of each flexible tie 121 which is remote from ring 122 is connected to the end of another flexible tie 121 by tightening means such as 124, shown in detail in FIGS. 2 and 3. In the example shown, in which the hub member 2 has the shape of a star with three arms, the flexible ties 122 are disposed along the sides of an equilateral triangle whose apices are approximately at the ends of the arms 3 which are nearest the rotating shaft 1.

In the embodiment in FIG. 2, each tightening means 124 comprises three elements 125, 126, 127.

Element 125 is a sleeve comprising a frusto-conical portion 125a having a small-diameter end terminating in a cylindrical portion 125b having a diameter slightly greater than that of cable 121. The large-diameter end of portion 125a terminates in an externally threaded cylindrical portion 125c. A collar 125d is provided at the junction of portions 125a and 125c. Collar 125d can be externally bounded by a prismatic surface having e.g., a hexagonal cross-section so that element 125 can be held in position by a spanner when element 126 is screwed. The cylindrical portion 125b is secured to the end of a flexible bond 121 by a suitable method, e.g., by crimping.

Element 126 comprises two concentric sleeves 126a, 126b interconnected at one end by a plate 126c at right angles to their axis. The inner diameter of sleeve 126a is equal to the outer diameter of cylindrical portion 125c and is internally threaded so as to cooperate with the thread of portion 125c. The radial clearance between the outer surface of sleeve 126b and the inner surface of sleeve 126a is sufficient to enable portion 125c to penetrate between sleeves 126a, 126b. The outer surface of sleeve 126a is prismatic and has e.g., a hexagonal cross-section, so that element 126 is in the form of a nut.

Sleeve 126b is formed with a bore having a diameter slightly larger than that of tie 121, so that one end of the latter can be threaded in element 126. Element 126 is disposed so that the open end of the radial space between sleeves 126b and 126a faces portion 125c.

Element 127 is in the form of a cylindrical sleeve terminating at one end in an annular collar having an outer diameter slightly less than the inner diameter of portion 125c. Element 127 is secured, e.g., by crimping, to the end of tie 121, on which element 126 engages. The collar of element 127 faces element 126, so that element 127 abuts element 126.

In order to adjust the tension of ties 121 connected by tightening means 124, it is merely necessary to screw or unscrew elements 125 and 126 with respect to one another.

FIG. 3 shows an alternative embodiment of tightening means 124a, wherein resilient elements 128 are disposed between element 127 and sleeve 126b. Advantageously, resilient elements 128 are compression washers. Elements 128 compensate the slack side and prevent excessive loosening of flexible ties 121 when the arms of the star forming hub member 2 bend in the direction opposite to that in which ties 121 are adapted to exert tension. In the example shown in FIG. 1, this occurs when connecting arms 3 and blades 4 exert upward bending forces on the arm of hub member 2.

A rigid hub of the kind described hereinbefore therefore behaves as follows:

When the blades 4 and connecting arms 3 exert simultaneous, identical downward bending forces on hub member 2, the ends of jaws 25 to which members 123 are secured by bolts 40 tend to move apart because of the tendency of the ends of the arms of hub 2 to bend downwards. Ties 121 then exert tension and oppose the aforementioned deformation. Consequently the hub member 2 has a high resistance to downward deformation.

On the other hand, when blades 4 and arms 3 exert upward bending forces on hub member 2, the securing means 123 tend to approach one another. In this case, ties 121 tend to slacken and do not oppose the upward deformation of hub member 2. When the tightening means comprises resilient elements 128, e.g., in the case of tightening means 124a, the slackening of ties 121 is limited or prevented. Consequently, the hub member 2 and the hub assembly can be flexibly deformed upwards.

When the bending moments applied to the different arms of the hub member are not identical or simultaneous but tend to cause tilting of the plane described by the blade ends, ties 121 do not affect the flexibility of the hub member, thus enabling the axis of the disc or cone described by the blades to make an angle with the axis of shaft 1.

It is clear from the preceding description that the check means 120 gives the hub member 2 high resistance to deformation resulting from simultaneous flapping motion of all the blades exerting a force downwards, i.e., in one direction of the rotary shaft 1. There is no change in the flexibility of hub member 2, enabling the plane described by the blade ends to tilt.

The check means 120 reduce the downward bending of blades 4, e.g., during landing, more particularly if there is sudden contact with the ground. This reduces the danger of the blades touching other portions of the device or persons moving on the ground.

The check means 120 enable the dimensions of hub 2 and the total volume of the propeller to be reduced. This is because in order to ensure that hub member 2 is sufficiently flexible, its thickness must be reduced at the same time as its dimensions. If there were no check means 120, the aforementioned reduction would be very rapidly limited by the decrease in the mechanical strength of the hub member.

Up to now, we have limited ourselves to the case where the check means 120 are disposed on one side of the hub member 2, i.e., above the latter in FIG. 1.

In some applications, it may be desirable to provide check means 120 on both sides of hub member 2 in order to give the latter high resistance to deformation resulting from simultaneous flapping motion of all the blades in both directions of rotation of shaft 1, while ensuring that hub member 2 can very flexibly tilt from the plane described by the blade ends. Check means 120 disposed on each side of hub member 2 can prevent excessive forward deformation of the propeller, especially of an axially horizontal propeller, e.g., in the case when a strong forward and/or backward pull is required, e.g., during a pitch reversal.

I claim:

1. In a rigid hub for a variable-pitch propeller having at least two propeller blades, the hub comprising a rotatable shaft, a flat hub member rigidly secured to said shaft and having at least two peripheral zones for attaching the propeller blades, a central plane of said flat hub member being at right-angles to said shaft and said flat hub member being flexible in a direction perpendicular to the central plane thereof, connecting means between said peripheral zones and each propeller blade, said connecting means comprising securing jaws rigidly mounted on said flat hub member, said securing jaws comprising extended portions at a vertical distance from the central plane of said flat hub member and check means comprising flexible ties designed to oppose any deformation of said flat hub member produced by simultaneous flapping motion of all the propeller blades in at least one direction parallel to the rotatable shaft and tightening means for positioning the flexible ties, the improvement comprising interconnecting said extended portions of said securing jaws by said flexible ties which are disposed in a plane which is substantially parallel to the central plane of said flat hub member but which plane is spaced vertically from said central plane, said ties being under tension when the blades are in a plane at right angles to the axis of the rotor, said tightening means comprising an externally threaded sleeve secured to one end of a metal cable, check means secured to the adjacent end of an adjacent metal cable, and a nut through which said adjacent metal cable extends and which can bear against said check means, said nut being screwable onto said externally threaded sleeve in order to adjust the tension of the metal cables.

2. A rigid hub of claim 1, in which one end of a metal cable has a ring engaging in a U-shaped securing means pivotably mounted on an extended portion of said securing jaws, and the other end of said metal cable is connected by said tightening means to an adjacent end of an adjacent cable.

3. A rigid hub of claim 1, in which said tightening means comprises resilient means for limiting the slackening of the flexible ties.

4. A rigid hub of claim 3, in which said resilient means comprises compression washers.

5. A rigid hub of claim 1, which comprises two assemblies of flexible ties disposed in planes which are substantially parallel to the central plane of said flat hub member, one of said assemblies being on each side of the central plane.

6. A rigid hub of claim 1, in which said hub member is a star having a number of arms.

7. A rigid hub of claim 1 for a propeller having at least three blades, in which the extended portion of one securing jaw is connected by two flexible ties to the extended portions of the two adjacent securing jaws so that the shape formed by the flexible ties is a closed polygon.

8. In a gyroplane rotor, a rigid hub according to claim 1, wherein the rotatable shaft is a substantially vertical rotating shaft.

9. In a propeller assembly, a rigid hub according to claim 1, wherein the rotatable shaft is a substantially horizontal rotating shaft.

10. A rigid hub as claimed in claim 1, wherein said flexible ties are metal cables.

* * * * *